US012292955B2

(12) United States Patent
Billman et al.

(10) Patent No.: US 12,292,955 B2
(45) Date of Patent: May 6, 2025

(54) DIGITAL PASS WITH USER VERIFICATION

(71) Applicant: BREAD FINANCIAL PAYMENTS, INC., Columbus, OH (US)

(72) Inventors: Christian Billman, Gahanna, OH (US); Jess Lawrence, Westerville, OH (US); Ryan Miller, Columbus, OH (US); Timothy D. Pontious, Gahanna, OH (US); Gabriel Rostorfer, Columbus, OH (US); Manoj Ram Tammina, Columbus, OH (US)

(73) Assignee: BREAD FINANCIAL PAYMENTS, INC., Columbus, OH (US)

( * ) Notice: Subject to any disclaimer, the term of this patent is extended or adjusted under 35 U.S.C. 154(b) by 26 days.

(21) Appl. No.: 16/828,404

(22) Filed: Mar. 24, 2020

(65) Prior Publication Data

US 2020/0334349 A1    Oct. 22, 2020

Related U.S. Application Data

(60) Provisional application No. 62/837,081, filed on Apr. 22, 2019.

(51) Int. Cl.
*G06F 21/34* (2013.01)
*G06F 16/955* (2019.01)
*G06F 21/45* (2013.01)

(52) U.S. Cl.
CPC ............ *G06F 21/34* (2013.01); *G06F 16/955* (2019.01); *G06F 21/45* (2013.01)

(58) Field of Classification Search
CPC ........ G06F 21/34; G06F 16/955; G06F 21/45; H04L 9/3228; G06Q 20/105; G06Q 20/322; G06Q 20/325; G06Q 20/326; G06Q 30/0253; G06Q 30/0267; G06Q 30/02
USPC ................ 705/14.51, 14.66, 14.23, 26.1, 44; 713/182
See application file for complete search history.

(56) References Cited

U.S. PATENT DOCUMENTS

| 8,694,438 | B1 * | 4/2014 | Jernigan | .......... G06Q 20/40975 |
| | | | | 705/67 |
| 9,916,582 | B2 * | 3/2018 | Aidasani | ................. G06Q 20/40 |
| 10,121,141 | B1 * | 11/2018 | Belleville | .......... G06Q 20/3672 |
| 2010/0125510 | A1 | 5/2010 | Smith | |

(Continued)

FOREIGN PATENT DOCUMENTS

WO    WO-2014042687 A1 *  3/2014    ............. G06F 21/35

OTHER PUBLICATIONS

Wikipedia, "Online Advertising", 2018, p. 4 (Year: 2018).*

(Continued)

*Primary Examiner* — Michael R Vaughan
*Assistant Examiner* — Ethan V Vo

(57) ABSTRACT

A system and method for a digital pass with user verification is disclosed. The method receives a request for the digital pass to be generated for a user. The request includes identification (ID) information that is added to a database. An image is defined for the digital pass, the image incorporates at least a portion of the ID information therein and is editable only by the digital pass management system. The method then generates the digital pass which includes the image and a non-image portion that is editable by the user. The digital pass is transmitted to the user's mobile device.

18 Claims, 5 Drawing Sheets

(56) References Cited

U.S. PATENT DOCUMENTS

| | | | | |
|---|---|---|---|---|
| 2012/0110646 | A1* | 5/2012 | Ajitomi | H04L 63/10 726/4 |
| 2012/0197691 | A1* | 8/2012 | Grigg | G06Q 20/20 705/14.1 |
| 2012/0310775 | A1* | 12/2012 | Laster-Fields | G06Q 30/02 715/202 |
| 2013/0024301 | A1* | 1/2013 | Mikan | G06K 7/10366 705/16 |
| 2013/0260734 | A1* | 10/2013 | Jain | H04L 63/08 455/418 |
| 2013/0346231 | A1* | 12/2013 | Hissong | G06Q 30/0635 705/26.81 |
| 2014/0055231 | A1 | 2/2014 | Amron | |
| 2014/0130035 | A1* | 5/2014 | Desai | G06Q 20/3829 717/172 |
| 2014/0263623 | A1* | 9/2014 | Robison | G06Q 20/204 235/380 |
| 2015/0026049 | A1* | 1/2015 | Theurer | G06Q 20/36 705/41 |
| 2015/0161605 | A1 | 6/2015 | Aidasani et al. | |
| 2015/0269625 | A1* | 9/2015 | Campbell | G06Q 30/0267 705/14.64 |
| 2015/0278805 | A1* | 10/2015 | Spencer, III | G06Q 20/3278 705/44 |
| 2016/0092869 | A1 | 3/2016 | Salama et al. | |
| 2016/0098701 | A1* | 4/2016 | Harris | G06Q 30/0267 705/14.64 |
| 2016/0210605 | A1* | 7/2016 | Vaish | G06Q 20/12 |
| 2016/0232518 | A1 | 8/2016 | Butler | |
| 2016/0239658 | A1* | 8/2016 | Loughlin-Mchugh | G06F 21/45 |
| 2016/0275491 | A1* | 9/2016 | Kaladgi | H04L 63/0853 |
| 2017/0251503 | A1 | 8/2017 | Bao et al. | |
| 2017/0316403 | A1* | 11/2017 | Borucki | G06Q 20/32 |
| 2017/0372345 | A1* | 12/2017 | Shastry | G06Q 30/0211 |
| 2018/0033002 | A1* | 2/2018 | Weiss | H04W 4/80 |
| 2018/0285916 | A1* | 10/2018 | Althauser | G06Q 20/351 |
| 2019/0057161 | A1* | 2/2019 | Ackerman | G06F 16/29 |
| 2019/0073665 | A1 | 3/2019 | Belleville et al. | |
| 2019/0179954 | A1 | 6/2019 | Mardikar | |
| 2019/0354823 | A1 | 11/2019 | Gaddam et al. | |

OTHER PUBLICATIONS

"The Authoritative Dictionary of IEEE Standards Terms, Seventh Edition," in IEEE Std 100-2000, vol. No., pp. 352, Dec. 11, 2000, doi: 10.1109/IEEESTD.2000.322230. (Year: 2000).*

* cited by examiner

10

DIGITAL PASS WITH USER VERIFICATION

CROSS-REFERENCE TO RELATED APPLICATIONS (PROVISIONAL)

This application claims priority to and benefit of co-pending U.S. Provisional Patent Application No. 62/837,081 filed on Apr. 22, 2019, entitled "DIGITAL PASS WITH USER VERIFICATION" by Billman et al., and assigned to the assignee of the present application, the disclosure of which is hereby incorporated by reference in its entirety.

BACKGROUND

It is often difficult for a user to track and/or remember their size in different clothing. This difficulty is further exacerbated when the measurements are obtained in-store and provided as a group of measurements, such as collar size, arm length, chest measurement, waist size, pant length, shoe size, etc. After being measured by a store associate, a user may receive a card with all of their measurements written thereon. However, keeping track of the card and/or measurements is often an exercise in futility, and is even more deleterious when a user starts shopping for others, such as a friend, parent, sibling, spouse, child, etc. It can also be embarrassing for the user if they purchase the wrong size for another person.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

DESCRIPTION OF EMBODIMENTS

Figure 1:
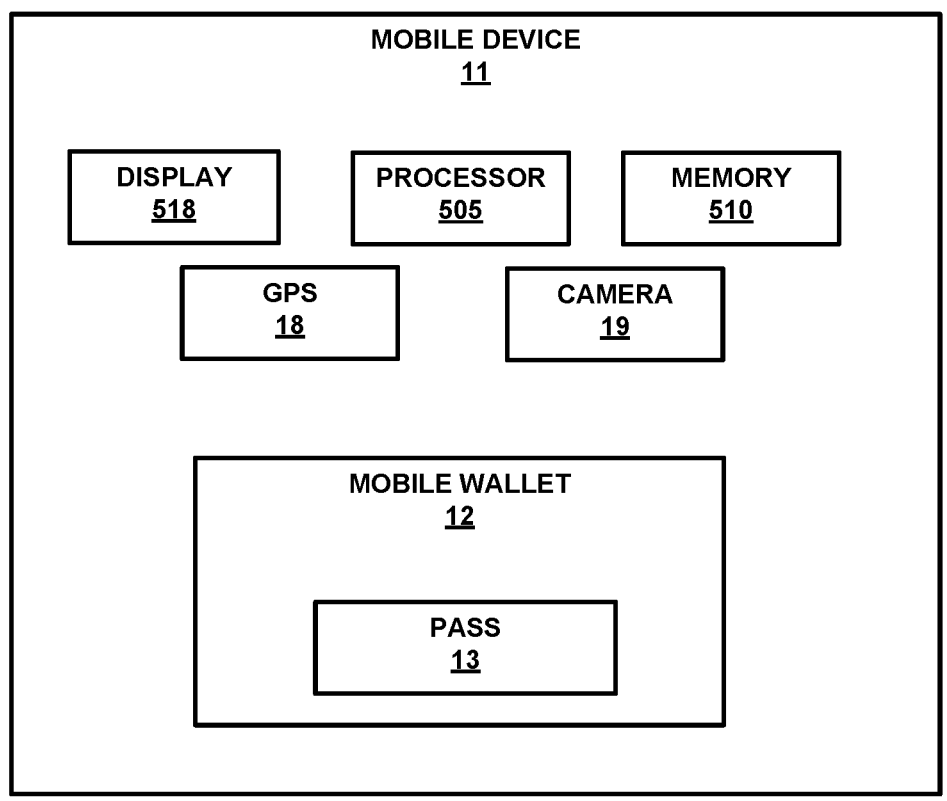
FIG. 1 is a block diagram of a mobile device, in accordance with an embodiment.

Reference will now be made in detail to various embodiments, examples of which are illustrated in the accompanying drawings. While the subject matter will be described in conjunction with these embodiments, it will be understood that they are not intended to limit the subject matter to these embodiments. On the contrary, the subject matter described herein is intended to cover alternatives, modifications and equivalents, which may be included within the spirit and scope as defined by the appended claims. In some embodiments, all or portions of the electronic computing devices, units, and components described herein are implemented in hardware, a combination of hardware and firmware, a combination of hardware and computer-executable instructions, or the like. In one embodiment, the computer-executable instructions are stored in a non-transitory computer-readable storage medium. Furthermore, in the following description, numerous specific details are set forth in order to provide a thorough understanding of the subject matter. However, some embodiments may be practiced without these specific details. In other instances, well-known methods, procedures, objects, and circuits have not been described in detail as not to unnecessarily obscure aspects of the subject matter.

Notation and Nomenclature

Unless specifically stated otherwise as apparent from the following discussions, it is appreciated that throughout the present Description of Embodiments, discussions utilizing terms such as "selecting", "outputting", "allowing," "limiting," "issuing," "preventing," "inputting", "providing", "receiving", "utilizing", "obtaining", "performing", "accessing", "authorizing" or the like, often refer to the actions and processes of an electronic computing device/system, such as a desktop computer, notebook computer, tablet, mobile phone, and electronic personal display, among others. The electronic computing device/system manipulates and transforms data represented as physical (electronic) quantities within the circuits, electronic registers, memories, logic, and/or components and the like of the electronic computing device/system into other data similarly represented as physical quantities within the electronic computing device/system or other electronic computing devices/systems.

Embodiments described herein provide a novel method for adding a digital pass to a mobile wallet on a user's mobile device. The digital pass includes a digital capture of a user's sizing information (e.g., a sizing card), style information, preference information, things that they liked, etc., that would be stored on a digital pass in a user's mobile device's mobile wallet. In one embodiment, the user could open the digital pass to retrieve and/or update the user's sizing information. For example, if the user was looking for a pair of shoes, they could look at the shoe sizing on the digital pass and determine that they had previously purchased (or tried on) a size 10. This information is especially valuable in the Internet shopping environment where it is impossible to try the shoe on, or when the user is buying shoes for someone else who is not presently available to try on the shoes. Although shoes are referenced here, the example could be for any sizing or preference information such as, but not limited to, clothing, jewelry, paint color, furnishings, electronics, vehicles and/or accessories, and the like.

Importantly, the embodiments of the present invention, as will be described below, provide an approach for digital pass utilization which differs significantly from the conventional processes used to store sizing information and provide user identification verification. In conventional approaches, the sizing information was not electronically available, updatable, or presentable as part of a mobile wallet. In addition, the use of an image on the pass used to store and provide user ID and/or device ID information were not interchangeable. As such, it was likely that a user would not have a digital pass that included both user editable and user non-editable information. Further, the embodiments described herein provide a digital pass that includes information associated therewith that is updateable (up to and including) each time the digital pass is accessed.

Thus, the present embodiments described herein, require a completely new and different system which is completely different than what was previously done because of the Internet-centric centralized aspect of the mobile wallet digital pass.

As will be described in detail, the various embodiments of the present invention do not merely implement conventional processes on a mobile device. Instead, the various embodiments of the present invention, in part, provide a novel process for storing, presenting, and utilizing user editable and non-editable information in a digital pass of a mobile wallet which is necessarily rooted in Internet-centric computer technology to overcome a problem specifically arising in the realm of digital pass technology.

Moreover, the embodiments do not recite a mathematical algorithm; nor do they recite a fundamental economic or longstanding commercial practice. Instead, they address a business challenge that has been born in the Internet-centric environment. Thus, the embodiments do not merely recite the performance of some business practice known from the pre-Internet world along with the requirement to perform it on a computing device. Instead, the embodiments are necessarily rooted in network-centric environments in order to overcome new problems specifically arising in the realm of digital passes.

Operation

Referring now to FIG. 1, a block diagram 10 of a mobile device 11 is shown. Although a number of components are shown as part of mobile device 11, it should be appreciated that other, different, more, or fewer components may be found on mobile device 11.

In general, mobile device 11 is an example of a user's mobile device, a store's mobile device, an associate's mobile device, or the like. Mobile device 11 could be a mobile phone, a smart phone, a tablet, a smart watch, a piece of smart jewelry, smart glasses, or other user portable devices having wireless connectivity. For example, mobile device 11 would be capable of broadcasting and receiving via at least one network, such as, but not limited to, WiFi, Cellular, Bluetooth, NFC, and the like. In one embodiment, mobile device 11 includes a display 518, a processor 505, a memory 510, a GPS 18, a camera 19, and the like. In one embodiment, instead of providing GPS information, the location of mobile device 11 may be determined within a given radius, such as the broadcast range of an identified beacon, a WiFi hotspot, overlapped area covered by a plurality of mobile telephone signal providers, or the like.

Mobile device 11 also includes a digital or mobile wallet 12 (passbook, or the like) which is an electronic application that operates on mobile device 11. Mobile wallet 12 includes digital pass 13. Although digital pass 13 is shown as part of mobile wallet 12, it should be appreciated that digital pass 13 could be located in a different application operating on mobile device 11, or stored elsewhere such as part of an email, text, or the like.

Figure 2:
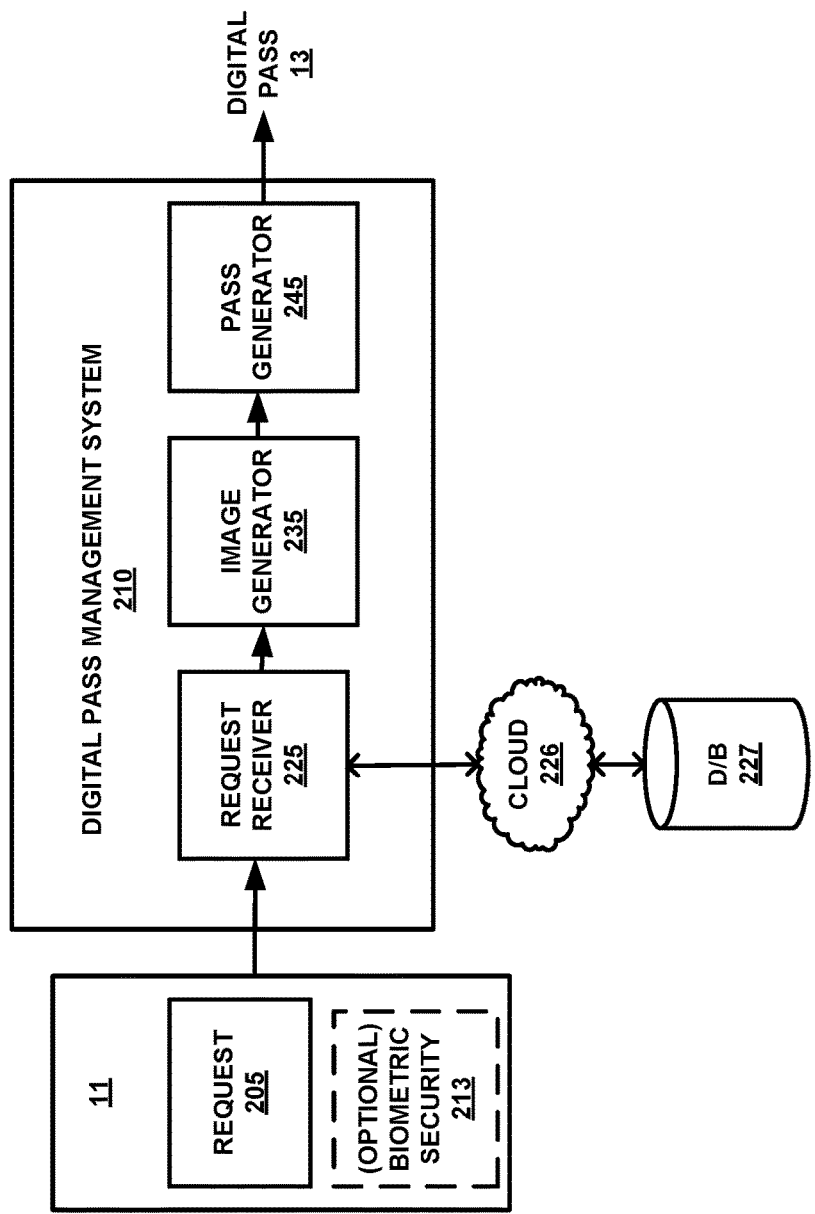
FIG. 2 is a block diagram of a digital pass management system, in accordance with an embodiment.

With reference now to FIG. 2, a block diagram of a system 200 for digital pass with user verification creation is shown in accordance with an embodiment. FIG. 2 includes mobile device 11, digital pass management system 210, cloud 226, database 227, and digital pass 13.

In one embodiment, mobile device 11 includes a request 205 and an optional biometric security 213. Request 205 is a request for digital pass with user verification that will include user preference information 310. Optional biometric security 213 can be any user biometrics such as, voice, image, print, or other user identifiable biometric that can be used to provide security, a decryption key, or the like.

Figure 5:
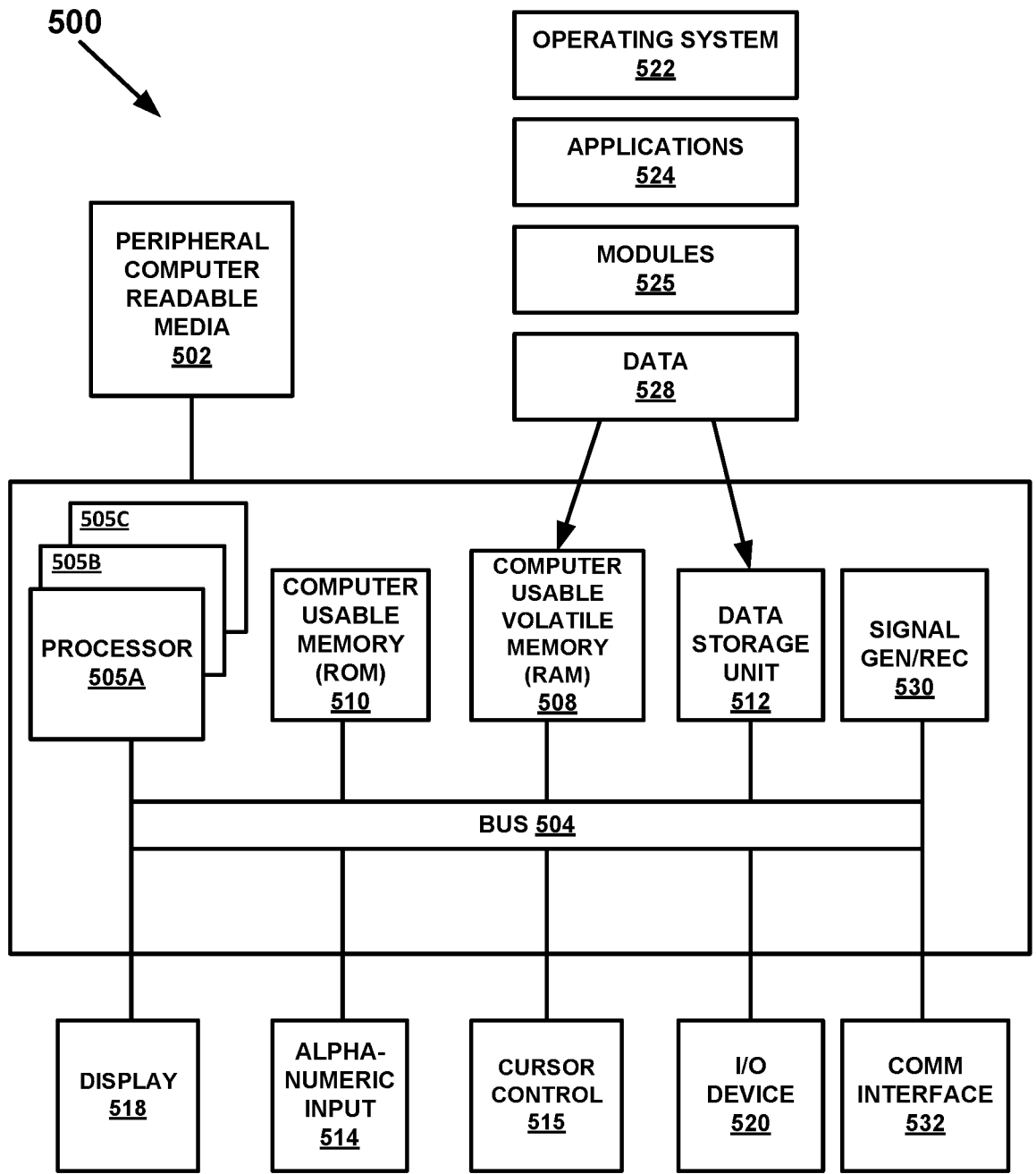
FIG. 5 is a block diagram of an example computer system with which or upon which various embodiments of the present invention may be implemented.

In one embodiment, digital pass management system 210 is a computing system such as computer system 500 described in detail in the FIG. 5 discussion herein. In one embodiment, digital pass management system 210 includes a request receiver 225, an image generator 235, and a digital pass generator 245.

In one embodiment, digital pass management system 210 receives the request 205 for a digital pass 130 to be added to the user's mobile wallet 12 at request receiver 225. In one embodiment, the request 205 includes user ID information and/or mobile device ID information. In general, a mobile device ID can include one or more identification characteristics such as: a telephone number or portion thereof, a serial number or portion thereof, an international mobile equipment identity (IMEI) or portion thereof, an integrated circuit card identifier (ICCID) (e.g., the SIM card number) or portion thereof, a mobile equipment identifier (MEID) or portion thereof, a secure element chipset identifier (SEID) or portion thereof, a media access control (MAC) address or portion thereof, an Internet protocol (IP) address or portion thereof, a universal unique identifier (UUID) or portion thereof, a model number or portion thereof, a product number or portion thereof, a serial number or portion thereof, or the like.

User ID can be information such as: a name, a zip code, a social security number or portion thereof, a driver's license number or portion thereof, a birth date, and the like that can be used to identify a specific user.

In one embodiment, the request 205 is received by the digital pass management system 210 from mobile device 11 via the cloud, mobile network, WiFi, or the like. In another embodiment, digital pass management system 210 receives the request 205 from a website that has been accessed by mobile device 11 (e.g., via the cloud, WiFi, mobile network, or the like).

In one embodiment, upon receiving request 205, request receiver 225 will access database 227 to build a user profile and store any received ID information in the user profile. In one embodiment, request receiver 225 accesses database 227 via cloud 226. An example of cloud 226 is a network such as the Internet, local area network (LAN), wide area network (WAN), or the like.

Database 227 could be a local database, a virtual database, a cloud database, a plurality of databases, or a combination thereof.

In one embodiment, database 227 can also store a plurality of user data files (such as credit accounts, reward accounts, and the like) and request receiver 225 could search database 227 for one or more existing data files that are held by the user as identified by the ID information included with the request. If any pre-existing data files are found, the information received would be compared/added/or otherwise tied to the existing user data file.

Image generator 235 generates an image for the digital pass and incorporates at least a portion of the ID information into the image. In one embodiment, the image is editable only by the digital pass management system 210. In one embodiment the image is a computer scannable image that is generated as an identifier for the user data file (or to include at least some of the ID information). Although in one embodiment, an image is generated, it should be appreciated that there may be an identification scheme other than an image that is used. For example, the image is a scannable code, a near field communication (NFC) protocol, a sound, or the like. In one embodiment, the image includes a token embedded within the image data. In one embodiment, the image is provided via a near field communication (NFC) between the mobile device 11 and the information requestor when digital pass 13 is accessed. Thus, the use of an image is provided as one embodiment as an example of a means of providing encryption, security, or the like.

Figure 3:
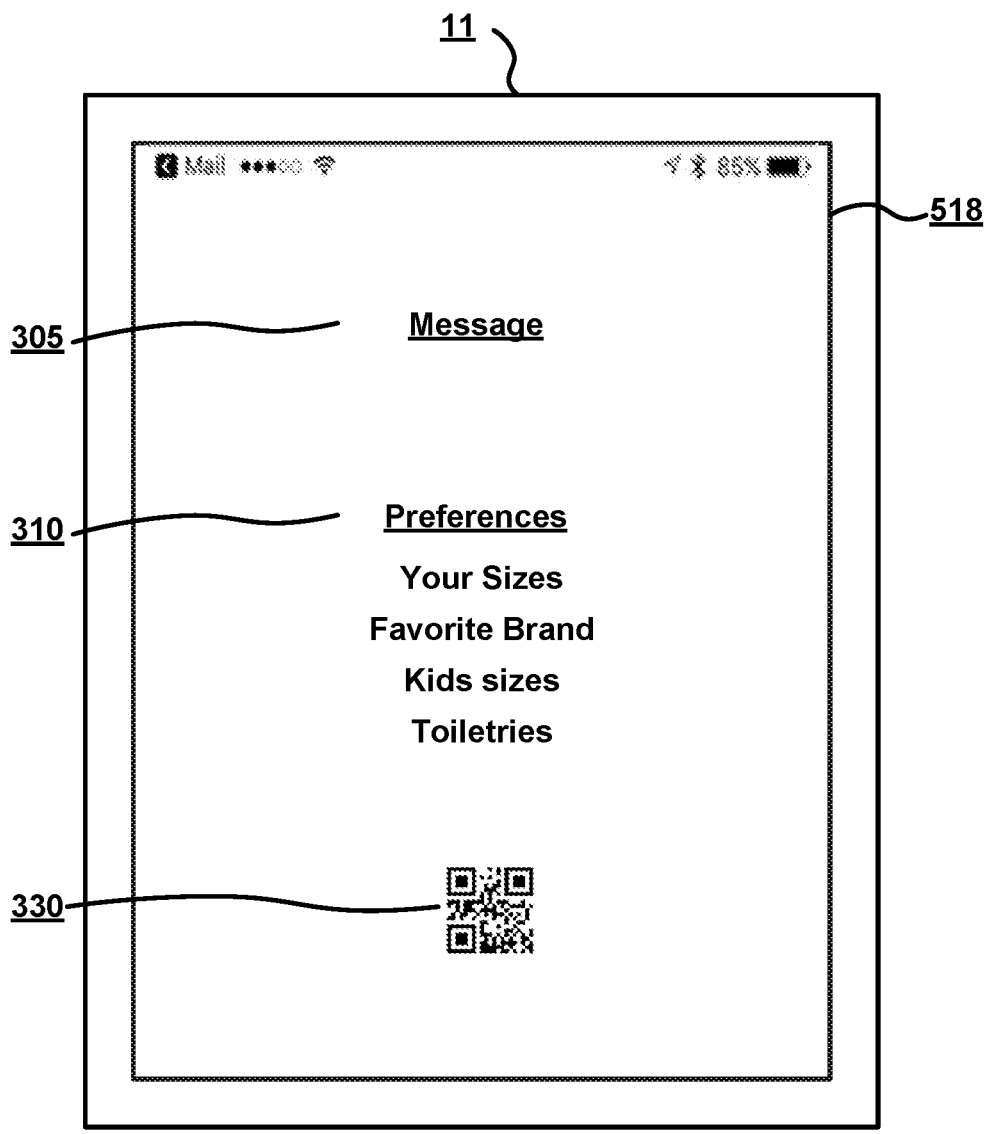
FIG. 3 is a mock-up diagram of a digital pass as presented on a display screen of a mobile device, in accordance with an embodiment.

Digital pass generator 245 generates a digital pass 13 formatted for mobile wallet 12, the digital pass 13 includes an image and a non-image portion that is editable by the user (as shown in FIG. 3). In one embodiment, digital pass 13 includes an instruction that causes the digital pass 13 to be presented in a first location of mobile wallet 12 on the user's mobile device 11.

The digital pass 13 is then provided from the digital pass management system 210 to the user's mobile device 11. The digital pass 13 is added to mobile wallet 12 on the user's mobile device 11, wherein accessing the digital pass 13 in the mobile wallet causes the digital pass 13 to be presented by the user's mobile device 11. As stated herein, the presentation of part or all of digital pass 13 could be visual (e.g., an image on the display screen), electronic (e.g., an NFC, Bluetooth, or similar electronic communications protocol), sound, or a combination thereof.

In one embodiment, the digital pass 13 is provided to mobile device 11 from pass generator 245 via a delivery method such as, but not limited to: a text, an email, a mobile push to a mobile wallet 12, via a network such as NFC, Bluetooth, WiFi, or the like.

For example, the pass generator 245 will send a message to mobile device 11 which will include the digital pass 13 information such that the opening of the text message will result in the insertion of the digital pass 13 into mobile wallet 12. In a mobile push scenario, the pass generator 245 will push the digital pass 13 to mobile device 11.

With reference now to FIG. 3, a block diagram of a digital pass 13 as presented on a display screen 518 of a mobile device 11 is shown in accordance with an embodiment. Although a number of different features are shown in conjunction with the description of digital pass 13, it should be appreciated that some embodiments may include additional features or may skip some of the features altogether.

Digital pass 13 includes message information 305, preference information 310 (e.g., a non-image portion that is editable by the user), and image 330. In general, preference information 310 is a portion of the digital pass that allows information to be add to the card by the user. In one embodiment, any or all of the information stored in the image 330, the message information 305, and/or the preference information 310, would have different access rights.

In one embodiment, message information 305 is a real-time message, information about an update, and the like. In general, message information 305 will allow the digital pass provider to send notifications to users within the user's digital wallet without the presence of a native application on the user's mobile device. In one embodiment, the message information 305 will include a number of lines (such as 4 in one example) and can provide messages like a credit balance, a due date, offers, and more. In one embodiment, the content of message information 305 could also be based on location information. For example, message information 305 could be a notification such as—"We see you're at Bill's. Stop in today to enjoy an additional $10 off your purchase today of $50 or more."

In one embodiment, the message information 305 could also include one or more selectable links to information the user may want to access. For example, the links could be to a last statement, paperless billing, a chat with a rep, a reward account, the digital pass management system user profile, and the like. In one embodiment, the information could be front of pass information and/or back of pass information. For example, if the front of the pass has a character limit or an update limit then most of the links and information could be accessed via the back of the pass. Similarly, if the back of the pass has a character limit or an update limit then most of the links and information could be accessed via the front of the pass.

Image 330 is a scannable code, such as a barcode, QR code, code embedded in a video, 2D image code, 3D image code, or the like. Image 330 can be a static or dynamic image. For example, if the image 330 is a static image, the image 330 would be the same (or change only when updated) each time the digital pass 13 was opened. The image 330 would include static information such as user identifiers, account identifiers, device identifiers, or the like which would not be subject to changing very often (e.g., other than system updates, etc.).

In contrast, a dynamic image 330 could be changed (or adjusted) each time the digital pass 13 is opened by the user (or at a given time period, any time a change to the stored information occurs, etc.). In one embodiment, the dynamic image 330 is requested from the digital pass management system 210 each time the digital pass 13 is accessed. That is, the image 330 would be provided from the digital pass management system 210 at the time of opening to ensure that image 330 remains up-to-date in real-time. In one embodiment, image 330 contains ID information that can be used to provide reliable and secure user identification information. For example, image 330 could be scanned or otherwise provided as part of an application process. By scanning the image 330, an authorized application process would be able to obtain some or all of the identification information accessible from image 330.

Figure 4:
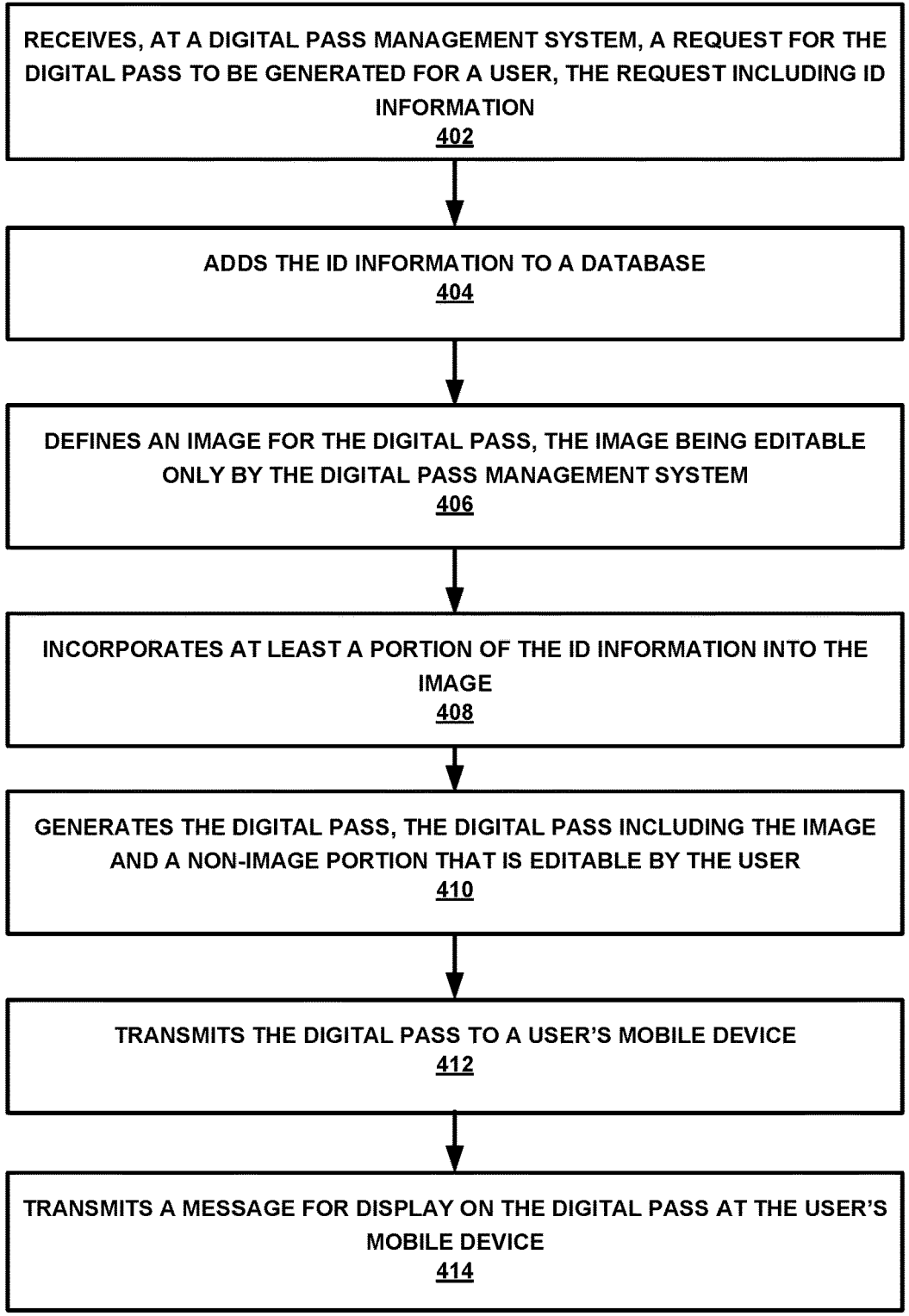
FIG. 4 is a flowchart of a method for generating a digital pass with user verification, in accordance with an embodiment.

With reference now to FIG. 4, a flowchart 400 of a method for providing a digital pass 13 with user verification is shown in accordance with an embodiment.

Referring now to 402 of FIG. 4, one embodiment receives, at a digital pass management system 210, a request for the digital pass 13 to be generated for a user, the request includes identification (ID) information. In one embodiment, the request for the digital pass 13 is received from the user's mobile device. In one embodiment, the request for the digital pass 13 is received from the user's computer system.

For purposes of clarity, in one embodiment, the mobile device 11 could be a mobile phone, a smart phone, a tablet, a smart watch, a piece of smart jewelry, smart glasses, or the like. In contrast, the user's computer system refers to any computing device such as a laptop, desktop, notebook, or other computer system that is not covered in the list of mobile devices (or the equivalents) provided above. Thus, for example, the request from a user's computer system could be a request from a home computer.

In one embodiment, the ID information includes at least a portion of two or more user identifiers from a group including, but not limited to, a name, an address, a zip code, a social security number, a driver's license number, a birth date, credit accounts, rewards accounts, and the like.

In one embodiment, the ID information includes at least a portion of each user identifier from the group including, but not limited to, a name, an address, a zip code, a social security number, a driver's license number, a birth date, and the like.

In one embodiment, the ID information includes at least a portion of two or more mobile device identifiers from a group including, but not limited to, a telephone number, a serial number, an IMEI, an ICCID, an MEID, an SEID, a MAC address, an IP address, a UUID, a model number, a product number, a serial number, and the like.

In one embodiment, the ID information includes at least a portion of each mobile device identifier from the group including, but not limited to, a telephone number, a serial number, an IMEI, an ICCID, an MEID, an SEID, a MAC address, an IP address, a UUID, a model number, a product number, a serial number, and the like.

With reference now to 404 of FIG. 4, one embodiment adds the ID information to a database 227. In one embodiment, the database is a secure database. In one embodiment, the database is part of a distributed system that includes a plurality of databases in a plurality of different locations. In one embodiment, the ID information is encrypted when it is added to the database. In one embodiment, in addition to the received ID information, additional identification information could be obtained from a retailer's computer system, a rewards account system, a credit account system, other information in the digital pass management system 210, or the like. In one embodiment, the additional information could be determined from the provided user ID and/or device ID information initially provided in the request 205. In one embodiment, once any related ID information is found, identified, etc. that information is added to the ID information stored in the database 227.

Referring now to 406 of FIG. 4, one embodiment defines an image 330 for the digital pass 13, the image 330 being editable only by the digital pass management system 210. For example, the information stored in the image 330 could be completely blocked from edit or adjustment by a user or other accessor of the mobile device 11. Instead, the information contained in the image 330 would be maintained by the digital pass management system 210 (or a retailer, database, credit account provider, clearinghouse, or the like).

If the user wanted to change the information stored in the image 330, the user would have to contact the information storage holder (e.g., digital pass management system 210) and provide a verifiable change. Moreover, if the user's address (or other user ID, device ID, account information, or the like) changes, the update to the information stored in the image 330 could be made without the user even knowing, or needing to act. As such, the information that is stored in the image 330 would have as high of a level of accuracy, encryption, safeguard, or the like, as desired. In so doing, when the information from the image 330 was used, it would be known to be maintained at a high level of accuracy and reliability.

With reference now to 408 of FIG. 4, one embodiment incorporates at least a portion of the ID information into the image 330. In one embodiment, it is a link to the ID information in the database that is incorporated into the image 330.

In one embodiment, the mobile device ID information that is incorporated into image 330 is determined based upon an evaluation of which of the possible mobile device ID's would provide the best capability for fraud prevention. For example, a user's phone number could be easily obtained (e.g., via social media, public records, white pages, Internet search, etc.) so it would be a lower mobile device ID option on a fraud scale. In contrast, the mobile device's serial number, IMEI, ICCID, MEID, SEID, or the like is much less likely to be obtained fraudulently (via social media, public records, guessed, etc.) so it may be that one of the IMEI, ICCID, MEID, SEID, or the like would be the mobile device ID requested due to the higher fraud prevention value.

In one embodiment, the user ID information that is incorporated into image 330 is determined based upon an evaluation of which of the possible user ID's would provide the best capability for fraud prevention. For example, a user's birthday could be easily obtained (e.g., via social media, public records, etc.) so it would be a lower user ID option on a fraud scale. Similarly, a user's address could be easily obtained (e.g., via social media, public records, etc.) so it would also be a lower user ID option on a fraud scale. Further, a user's email could be easily obtained (e.g., via social media, public records, etc.) or easily guessed, so it would also be a lower user ID option on a fraud scale. In contrast, a social security number (or last four, six, seven, five, middle three, five, first 6, 7; middle three+last two; or any other amount or combination of the nine social security numbers) is much less likely to be obtained fraudulently (e.g., via social media, public records, guessed, etc.) so it may be that a pre-selected portion of the SSN (or a changing selected portion of the SSN) would be the user ID with the highest fraud prevention value.

In one embodiment, the image is updateable as the ID information changes. For example, once any related ID information is found, identified, etc., that information is added to the ID information stored in the database 227. Moreover, some or all of the related information could be added to the information referenced by image 330. Thus, an update to the user information file (such as an identification of a reward account and the addition of the reward account information added to the user information file in the database 227) would likely cause the information identified by the image 330 to need to be updated. The updated image could include updated user ID information, credit information, rewards points, and the like.

Referring now to 410 of FIG. 4, one embodiment generates the digital pass 13, the digital pass 13 including the image 330, a non-image portion (e.g., preference information 310) that is editable by the user, and message information 305. In one embodiment, the user editable non-image portion is user defined preference information 310 such as sizing, style, brand, manufacturer, etc.

In other words, in one embodiment, any or all of the information stored in the image 330, the message information 305, and the preference information 310 on the digital pass 13, would have different access rights. For example, the preference information 310 could be edited by the user, by a sales associate, updated via an email, text, or the like. Thus, the ability to adjust the preference information 310 could be as easy or hard as the user desired. In one embodiment, the user could let the digital pass 13 be updated based on an email, text (or other communication) from someone that includes sizing information, brand information, a purchase request, etc. In a harder update scenario, the user could only allow an update to the preference information 310 with an edit, replacement, or the like actually performed on the user's device, performed by the user, etc.

In one embodiment, information such as a user's sizing information (e.g., a sizing card), style information, things that they liked, etc., would be stored in the preference information 310 of the digital pass 13 in a user's mobile wallet 12. In one embodiment, the user could open the digital pass 13 to view the user's stored preference information 310. Thus, if the user was looking for a pair of shoes, they could look at the shoe sizing in the preference information 310 on the digital pass 13 and determine that they had previously purchased (or tried on) a size 10. As such, and especially in the Internet shopping environment where it is impossible to try the shoe on, the user would have a good idea of their present shoe size. In one embodiment, a store associate could provide the preference information 310 electronically from the associate's mobile device to the user's digital pass 13 based on a fitting/sizing/etc. In one embodiment, after purchase, the sizing information for the purchase could be electronically passed from the retailer to the preference information 310 on the user's digital pass 13. In one embodiment, the electronic passing of data could be via text, email, beacon, WiFi, Bluetooth, NFC, or the like.

In addition to the user's own sizing information, the digital pass 13 could also include the preference information 310 for others known to the user. For example, preference information 310 could include a partner's information, a child's information, a friend's information, a friend's child's information, a relative's information 310, etc. For example, a parent would be shopping and see kids shoes on sale. The parent could open the digital pass 13 and look-up the child's shoe size in the preference information 310. In another example, a user could open the digital pass 13 and look to preference information 310 for the type (or brand) of washing machine detergent to purchase, the type of shampoo to buy, etc. Similarly, the user could text someone else about the unknown preference information 310 and then import the information (automatically or manually) into the preference information 310 portion of digital pass 13.

With reference now to 412 of FIG. 4, one embodiment transmits the digital pass 13 to a user's mobile device 11. In one embodiment, the digital pass 13 is automatically added to a mobile wallet 12 on the mobile device 11 when the digital pass 13 is received at the mobile device 11.

With reference now to 414 of FIG. 4, one embodiment transmits a message information 305 to the digital pass 13 to a user's mobile device 11. In one embodiment, message information 305 is displayed as part of the digital pass 13. In one embodiment, message information 305 is a real-time message. In general, message information 305 will allow the digital pass provider to send notifications to users within the user's digital wallet without the presence of a native application on the user's mobile device. In one embodiment, the message information 305 will include a number of lines (such as 4 in one example) and can provide messages like a credit balance, a due date, offers, and more. In one embodiment, the content of message information 305 could also be based on location information. For example, message information 305 could be a notification such as—"We see you're at Bill's. Stop in today to enjoy an additional $10 off your purchase today of $50 or more."

In one embodiment, the message information 305 could also include one or more selectable links to information the user may want to access. For example, the links could be to a last statement, paperless billing, a chat with a rep, a reward account, the digital pass management system user profile, and the like. In one embodiment, the links could be provided as part of the front of pass information and/or the back of pass information. For example, if the front of the pass has a no-link restriction, then the links would be accessed via the back of the pass. Similarly, if the back of the pass has a no-link restriction, then the links would be accessed via the front of the pass. If the pass does not have any link restrictions, then the links could be located based on provider option, user option, and the like.

User Verification

In one embodiment, the information contained in the image 330 is used to provide reliable and secure user information. For example, when presenting a digital pass 13, the mobile wallet 12 will incorporate image 330 such as a brand logo, barcode, etc. However, instead of just showing a brand logo, barcode, or the like, the image 330 provided by the digital pass 13 can be a static or dynamic image. For example, if the image 330 is a static image, the image 330 would be the same (or change only when updated) each time the digital pass 13 was opened. The image 330 would include static information such as user identifiers, account identifiers, and the like which would not be subject to changing very often.

In contrast, a dynamic image on the digital pass 13 would be an image 330 that can be changed (or adjusted) each time (or at a given time period, any time a change to the stored information occurs, etc.) the digital pass 13 is opened by the user. In one embodiment, the image 330 would be requested from the digital pass management system 210 when the digital pass 13 was initially accessed. The image 330 would be provided to the digital pass 13 at the time of opening to ensure that it is up-to-date in real-time.

In one embodiment, mobile device 11 will receive a command to display the digital pass 13. Upon receipt of the command, mobile device 11 will submit an image 330 update request to digital pass management system 210. If there is an updated image 330, then digital pass management system 210 would provide the updated image 330 received by mobile device 11 and amended to digital pass 13 for presentation. In one embodiment, if there is no updated image 330, mobile device 11 could receive the existing image 330 from digital pass management system 210, receive an indication from digital pass management system 210 to display the existing image 330, or the like.

In one embodiment, digital pass management system 210 will receive an indication that the mobile device 11 has been asked to display the digital pass 13. Upon receipt of the indication, digital pass management system 210 could push an updated image 330 for the digital pass 13 to the mobile device 11.

For example, if the user is opening the digital pass 13 for a reward redemption, the image 330 that is presented on the digital pass 13 will be an image 330 that includes data that is presently relevant (e.g., the user's real-time rewards balance (or offers, coupons, etc.)). Thus, the image 330 presented on the digital pass 13 could be different each time the digital pass 13 is opened, or any time the information provided by the digital pass 13 has changed. For example, if the user used the digital pass 13 for reward points on a purchase yesterday (when the rewards points balance was 2,500 and the purchase gave the user 200 points), when the user opens the digital pass 13 today, the image 330 on the digital pass 13 would include information about the rewards points that includes the new total rewards points balance (e.g., 2,700). Similarly, if the prior purchase caused a one-time 20% discount to be obtained in addition to the 200 new points, the new image 330 on the digital pass 13 would indicate both the new total rewards points balance (e.g., 2,700) as well as the available one-time 20% discount.

In one embodiment, when the image 330 on the digital pass 13 is scanned at a POS by an associate's mobile device, or the like, the image 330 would provide the user's rewards, discounts, or the like.

The digital pass 13 could be used in conjunction with other components of the mobile device (such as location information, etc.). For example, when the digital pass 13 is opened by the user, the digital pass 13 would obtain the location of the mobile device. In one embodiment, that information would be used to identify that the user has entered a geofenced area such as a store, or the like. This location determination would trigger a message such as a text messages, an email, a URL, the initiation of other apps on the mobile device, or the like. The message would provide the user with information/offers/etc. that are relevant to the user's present location.

In one embodiment, when there is a change to the digital pass 13 (or information to be provided via the digital pass 13), an indication would occur in the mobile wallet 12. When the mobile wallet 12 indication was accessed by the user, the information that had been sent to the digital pass 13 would be presented to the user: e.g., offers, coupons, sizing information, etc. Other reasons for an indication to be provided could include aspects such as, but not limited to, statuses or alerts regarding an account, disaster information in the person's area (payments in your region are waived this month due to a hurricane, etc.), notification of credit limit increase, a spectacular sale, an annual event, a birthday (or other date) reminder, and the like.

In one embodiment, the image 330 in the digital pass 13 can be used to provide two-factor authentication when the user applies for an account (credit, reward, etc.). The first factor would be the user interacting with the user's mobile device (e.g., thereby generating a user ID, device ID, etc.). The second factor would be the information stored in the image 330 of the digital pass 13 is what would be electronically obtained by the user's mobile device (or other computing device performing the application process). The information stored in the image 330 would be used to fill out the application. As such, the two factor authentication would provide a reduction in fraud since the two factor authentication would result in information being provided from a reliable source instead of unverified information being provided by a user.

For example, image 330 could be scanned or otherwise provided as part of an application process. By scanning the image 330, an authorized application process would be able to request or obtain some or all of the identification information accessible from image 330. For example, a user wants to apply for a credit account. The credit application process asks the user to present the digital pass 13 and then captures image 330 from the display screen (or a microphone, etc.). If the credit application process is pre-authorized, then it would be able to unlock some or all of the ID information that is stored in image 330. The ID information could then be designated as reliable (or somewhat reliable) information by the application process which could allow the information to be deemed as less risky (or more secure) than user keyed information. This could be important for user status, credit limit establishment, fraud determination purposes, and the like.

In another example, a user wants to apply for a reward account. The reward application captures image 330 from the display screen (or a microphone, etc.). Instead of obtaining ID information stored within the image 330, the reward program would obtain a requesting channel and an identifier from the information that is stored in image 330. That is, a channel to contact digital pass management system 210 and an identifier from the image that is linked to the underlying user and/or device ID in database 227. In one embodiment, digital pass management system 210 would verify that the digital pass 13 was accessed on the mobile device 11 and verify the validity of the information request (which could be a validation of the requestor, the machine from which the request was sent, the security profile of the machine making the request, a review of pirate databases, bad boy lists, etc., and the like.). Once the digital pass management system 210 positively verifies the access and the validity of the requestor, the digital pass management system 210 could provide some of the ID information from database 227 to the reward program.

In so doing, the ID information received by the reward program can be designated as reliable (or somewhat reliable) information which could allow the information to be deemed as less risky (or more secure) than user keyed information. This could be important for user status, fraud determination purposes, and the like.

Example Computer System

With reference now to FIG. 5, portions of the technology for providing a communication composed of computer-readable and computer-executable instructions that reside, for example, in non-transitory computer-readable medium (or storage media, etc.) of a computer system. That is, FIG. 5 illustrates one example of a type of computer that can be used to implement embodiments of the present technology. FIG. 5 represents a system or components that may be used in conjunction with aspects of the present technology. In one embodiment, some or all of the components described herein may be combined with some or all of the components of FIG. 5 to practice the present technology.

FIG. 5 illustrates an example computer system 500 used in accordance with embodiments of the present technology. It is appreciated that computer system 500 of FIG. 5 is an example only and that the present technology can operate on or within a number of different computer systems including general purpose networked computer systems, embedded computer systems, routers, switches, server devices, user devices, various intermediate devices/artifacts, stand-alone computer systems, mobile phones, personal data assistants, televisions and the like. As shown in FIG. 5, computer system 500 of FIG. 5 is well adapted to having peripheral computer readable media 502 such as, for example, a disk, a compact disc, a flash drive, and the like coupled thereto.

Computer system 500 of FIG. 5 includes an address/data/control bus 504 for communicating information, and a processor 505A coupled to bus 504 for processing information and instructions. As depicted in FIG. 5, computer system 500 is also well suited to a multi-processor environment in which a plurality of processors 505A, 505B, and 505C are present. Conversely, computer system 500 is also well suited to having a single processor such as, for example, processor 505A. Processors 505A, 505B, and 505C may be any of various types of microprocessors. Computer system 500 also includes data storage features such as a computer usable volatile memory 508, e.g., random access memory (RAM), coupled to bus 504 for storing information and instructions for processors 505A, 505B, and 505C.

Computer system 500 also includes computer usable non-volatile memory 510, e.g., read only memory (ROM), coupled to bus 504 for storing static information and instructions for processors 505A, 505B, and 505C. Also present in computer system 500 is a data storage unit 512 (e.g., a magnetic disk drive, optical disk drive, solid state drive (SSD), and the like) coupled to bus 504 for storing information and instructions. Computer system 500 also can optionally include an alpha-numeric input device 514 including alphanumeric and function keys coupled to bus 504 for communicating information and command selections to processor 505A or processors 505A, 505B, and 505C. Computer system 500 also can optionally include a cursor control device 515 coupled to bus 504 for communicating user input information and command selections to processor 505A or processors 505A, 505B, and 505C. Cursor control device may be a touch sensor, gesture recognition device, and the like. Computer system 500 of the present embodiment can optionally include a display 518 coupled to bus 504 for displaying information.

Referring still to FIG. 5, display 518 of FIG. 5 may be a liquid crystal device, cathode ray tube, OLED, plasma display device or other display device suitable for creating graphic images and alpha-numeric characters recognizable to a user. Cursor control device 515 allows the computer user to dynamically signal the movement of a visible symbol (cursor) on display 518. Many implementations of cursor control device 515 are known in the art including a trackball, mouse, touch pad, joystick, non-contact input, gesture recognition, voice commands, bio recognition, and the like. In addition, special keys on alpha-numeric input device 514 capable of signaling movement of a given direction or manner of displacement. Alternatively, it will be appreciated that a cursor can be directed and/or activated via input from alpha-numeric input device 514 using special keys and key sequence commands.

Computer system 500 is also well suited to having a cursor directed by other means such as, for example, voice commands. Computer system 500 also includes an I/O device 520 for coupling computer system 500 with external entities. For example, in one embodiment, I/O device 520 is a modem for enabling wired or wireless communications between computer system 500 and an external network such as, but not limited to, the Internet or intranet. A more detailed discussion of the present technology is found below.

Referring still to FIG. 5, various other components are depicted for computer system 500. Specifically, when present, an operating system 522, applications 524, modules 525, and data 528 are shown as typically residing in one or some combination of computer usable volatile memory 508, e.g. random-access memory (RAM), and data storage unit 512. However, it is appreciated that in some embodiments, operating system 522 may be stored in other locations such as on a network or on a flash drive; and that further, operating system 522 may be accessed from a remote location via, for example, a coupling to the internet. In one embodiment, the present technology, for example, is stored as an application 524 or module 525 in memory locations within RAM 508 and memory areas within data storage unit 512. The present technology may be applied to one or more elements of described computer system 500.

Computer system 500 also includes one or more signal generating and receiving device(s) 530 coupled with bus 504 for enabling computer system 500 to interface with other electronic devices and computer systems. Signal generating and receiving device(s) 530 of the present embodiment may include wired serial adaptors, modems, and network adaptors, wireless modems, and wireless network adaptors, and other such communication technology. The signal generating and receiving device(s) 530 may work in conjunction with one (or more) communication interface 532 for coupling information to and/or from computer system 500. Communication interface 532 may include a serial port, parallel port, Universal Serial Bus (USB), Ethernet port, Bluetooth, thunderbolt, NFC port, WiFi, Cellular modem, or other input/output interface. Communication interface 532 may physically, electrically, optically, or wirelessly (e.g., via radio frequency) couple computer system 500 with another device, such as a mobile phone, radio, or computer system.

Computer system 500 is only one example of a suitable computing environment and is not intended to suggest any limitation as to the scope of use or functionality of the present technology. Neither should the computing environment be interpreted as having any dependency or requirement relating to any one or combination of components illustrated in the example computer system 500.

The present technology may be described in the general context of computer-executable instructions, such as program modules, being executed by a computer. Generally, program modules include routines, programs, objects, components, data structures, etc., that perform particular tasks or implement particular abstract data types. The present technology may also be practiced in distributed computing environments where tasks are performed by remote processing devices that are linked through a communications network. In a distributed computing environment, program modules may be located in both local and remote computer-storage media including memory-storage devices.

The foregoing Description of Embodiments is not intended to be exhaustive or to limit the embodiments to the precise form described. Instead, example embodiments in this Description of Embodiments have been presented in order to enable persons of skill in the art to make and use embodiments of the described subject matter. Moreover, various embodiments have been described in various combinations. However, any two or more embodiments may be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A method for providing a digital pass with user verification, the method comprising:
receiving, at a digital pass management system, a request for the digital pass to be generated for a user, the request comprising: identification (ID) information;
adding the ID information to a database;
defining an image for the digital pass, the image having a first access right such that said image is only editable by the digital pass management system;
incorporating at least a portion of the ID information into the image;
generating the digital pass, the digital pass comprising:
said image; and
a non-image portion having a second access right different from said first access right, said non-image portion comprising user specific preference information from a group consisting of: sizing, style, brand, and manufacturer, said second access right allowing said user specific preference information of said non-image portion to be edited without requiring access permission from said digital pass management system when said digital pass is located in a mobile wallet of a mobile device of said user, said editing of said user specific preference information comprising:
after a purchase, electronically receiving sizing information from a retailer device and adding said sizing information to said user specific preference information; and
automatically updating said user specific preference information with preference information within a communication received at said mobile device.

2. The method of claim 1, wherein the digital pass further comprises:
an information message portion that receives notifications sent from the digital pass management system, said information message portion having a third access right, said third access right different from either said first access right or said second access right.

3. The method of claim 2, wherein the information message portion further comprises:

one or more selectable links to information, the selecting of the link causing a web browser on the mobile device to navigate to an information page designated by the link.

4. The method of claim 1, further comprising:
automatically adding the digital pass to a mobile wallet on the mobile device when the digital pass is received at the mobile device.

5. The method of claim 1, where the ID information comprises at least a portion of two or more user identifiers from a group consisting of: a name, an address, a zip code, a social security number, a driver's license number, and a birth date.

6. The method of claim 1, where the ID information comprises at least a portion of each user identifier from a group consisting of: a name, an address, a zip code, a social security number, a driver's license number, and a birth date.

7. The method of claim 1, where the ID information comprises at least a portion of two or more mobile device identifiers from a group consisting of: a telephone number, an international mobile equipment identity (IMEI), an integrated circuit card identifier (ICCID), a mobile equipment identifier (MEID), a secure element chipset identifier (SEID), a media access control (MAC) address, an Internet protocol (IP) address, a universal unique identifier (UUID), a model number, a product number, and a serial number.

8. The method of claim 1, where the ID information comprises at least a portion of each mobile device identifier from a group consisting of: a telephone number, an international mobile equipment identity (IMEI), an integrated circuit card identifier (ICCID), a mobile equipment identifier (MEID), a secure element chipset identifier (SEID), a media access control (MAC) address, an Internet protocol (IP) address, a universal unique identifier (UUID), a model number, a product number, and a serial number.

9. A non-transitory computer-readable medium for storing instructions, the instructions comprising:
one or more instructions which, when executed by one or more processors, cause one or more processors to:
receive a request at a digital pass management system for a digital pass to be generated for a user,
the request comprising: identification (ID) information;
add the ID information to a database;
generate an image for the digital pass, the image having a first access right such that said image is only editable by the digital pass management system;
incorporate at least a portion of the ID information into the image;
generate the digital pass, the digital pass comprising: said image; and
a non-image portion having a second access right different from said first access right, said non-image portion comprising user specific preference information from a group consisting of: sizing, style, brand, and manufacturer, said second access right allows said user specific preference information of said non-image portion to be edited without requiring access permission from said digital pass management system when said digital pass is located in a mobile wallet of a mobile device of said user, said editing of said user specific preference information comprising:
after a purchase, electronically receive sizing information from a retailer device and add said sizing information to said user specific preference information; and
automatically update said user specific preference information with preference information within a communication received at said mobile device; and
send the digital pass to said mobile device of the user.

10. The non-transitory computer-readable medium of claim 9, where the request for the digital pass is received from the mobile device.

11. The non-transitory computer-readable medium of claim 9, where the request for the digital pass is received from a user's computer system.

12. The non-transitory computer-readable medium of claim 9, where the one or more instructions further cause one or more processors to:
automatically add the digital pass to a mobile wallet on the mobile device when the digital pass is received at the mobile device.

13. The non-transitory computer-readable medium of claim 9, where the ID information comprises at least a portion of three or more user identifiers from a group consisting of: a name, an address, a zip code, a social security number, a driver's license number, and a birth date.

14. The non-transitory computer-readable medium of claim 9, where the ID information comprises at least a portion of three or more mobile device identifiers from a group consisting of: a telephone number, an international mobile equipment identity (IMEI), an integrated circuit card identifier (ICCID), a mobile equipment identifier (MEID), a secure element chipset identifier (SEID), a media access control (MAC) address, an Internet protocol (IP) address, a universal unique identifier (UUID), a model number, a product number, and a serial number.

15. The non-transitory computer-readable medium of claim 9, where the one or more instructions further cause one or more processors to:
receive, at the digital pass management system, an information request for at least some of the ID information contained in the image;
verify that the digital pass was accessed on the mobile device;
verify an identity of a party that provided the information request; and
provide, upon positive verification of the access and the identity, the at least the portion of the ID information.

16. A system comprising:
a digital pass management system comprising:
a memory;
a storage; and
one or more processors to:
receive a request for a digital pass to be generated for a user,
the request comprising:
a user identification (ID) information, and
a device ID information;
add the user ID information and the device ID information to a database;
develop an image for the digital pass, the image having a first access right such that said image is only editable by the digital pass management system;
link the image to the user ID information and the device ID information in the database;
generate the digital pass, the digital pass comprising: said image; and
a non-image portion having a second access right different from said first access right, said non-image portion comprising user specific preference information from a group consisting of: sizing, style, brand, and manufacturer, said second access right allows said user specific preference information of said non-image portion to be edited without requiring access permission from said digital pass management system when said digital pass is located in a mobile wallet of a mobile device of said user, said editing of said user specific preference information comprising:
    after a purchase, electronically receive sizing information from a retailer device and add said sizing information to said user specific preference information; and
    automatically update said user specific preference information with preference information within a communication received at said mobile device; and
send the digital pass to said mobile device of the user.

17. The system of claim 16 where the one or more processors of the digital pass management system are further to:
    receive an information request for at least some of the ID information linked to the image;
    verify that the digital pass was accessed on the mobile device;
    verify a validity of the information request; and
    provide, upon positive verification of the access and the validity, the at least some of the ID information.

18. The system of claim 16 where the one or more mobile device processors are further to:
    receive an image update request;
    generate an updated image; and
    send said updated image to said digital pass on said mobile device of said user.

\* \* \* \* \*